United States Patent
Zhen

(10) Patent No.: US 8,690,250 B2
(45) Date of Patent: Apr. 8, 2014

(54) INFANT CARRIER APPARATUS HAVING MULTIPLE CONFIGURATIONS OF USE AND ITS OPERATING METHOD

(75) Inventor: Xiang Yong Zhen, Central Hong Kong (HK)

(73) Assignee: Wonderland Nurserygoods Company Limited, Hong Kong (HK)

( * ) Notice: Subject to any disclaimer, the term of this patent is extended or adjusted under 35 U.S.C. 154(b) by 414 days.

(21) Appl. No.: 13/110,604

(22) Filed: May 18, 2011

(65) Prior Publication Data

US 2011/0291455 A1 Dec. 1, 2011

(30) Foreign Application Priority Data

May 28, 2010 (CN) .......................... 2010 1 0192115

(51) Int. Cl.
*B60N 2/34* (2006.01)
(52) U.S. Cl.
USPC .................. 297/377; 297/354.12; 297/354.13
(58) Field of Classification Search
USPC .................. 297/354.13, 377, 354.12
See application file for complete search history.

(56) References Cited

U.S. PATENT DOCUMENTS

| | | | |
|---|---|---|---|
| 4,805,928 A | | 2/1989 | Nakao et al. |
| 6,270,111 B1 * | | 8/2001 | Hanson et al. ............... 297/377 |
| 6,830,254 B2 * | | 12/2004 | Lan ......................... 297/354.12 |
| 7,219,959 B2 * | | 5/2007 | Ransil et al. ................. 297/277 |
| 7,364,235 B2 * | | 4/2008 | Chen et al. ................... 297/377 |
| 7,832,744 B2 * | | 11/2010 | Chen et al. ............... 297/354.12 |
| 2007/0069566 A1 * | | 3/2007 | Li ................................ 297/377 |

FOREIGN PATENT DOCUMENTS

| | | |
|---|---|---|
| CN | 2241660 Y | 12/1996 |
| DE | 3405210 A1 | 8/1985 |
| DE | 29511286 U1 | 11/1995 |
| EP | 2179908 A2 | 4/2010 |
| GB | 2089292 A | 6/1982 |
| JP | 9193810 A | 7/1997 |

* cited by examiner

*Primary Examiner* — Anthony D Barfield
(74) *Attorney, Agent, or Firm* — David I. Roche; Baker & McKenzie LLP

(57) ABSTRACT

An infant carrier apparatus comprises a seat assembly, a backrest assembly including a first and second backrest frame, and a backrest holding mechanism. The first backrest frame includes first side and transverse segments, the second backrest frame includes second side and transverse segments, the first side segment being coupled with the seat assembly via a first pivot point. The backrest holding mechanism can be movably assembled between the first and second transverse segment, and include a latch element movable between a first and second position. The first position of the latch element causes the backrest holding mechanism to be in locking engagement with the first transverse segment to prevent rotation of the backrest assembly relative to the seat assembly, and the second position of the latch element removes the locking engagement of the backrest holding mechanism to permit rotation of the backrest assembly relative to the seat assembly.

17 Claims, 9 Drawing Sheets

INFANT CARRIER APPARATUS HAVING MULTIPLE CONFIGURATIONS OF USE AND ITS OPERATING METHOD

CROSS-REFERENCE TO RELATED APPLICATION

This application claims priority to Chinese Patent Application No. 201010192115.7 filed on May 28, 2010.

BACKGROUND OF THE INVENTION

1. Field of the Invention

The present invention relates to infant carrier apparatuses, and more particularly to an infant carrier apparatus having multiple configurations of use and its operating method.

2. Description of the Related Art

A stroller apparatus typically comprises a support frame provided with wheels, a seat assembly, a backrest assembly and a handle. After a child is placed on the seat, the parent can use the handle to push the stroller in movement. In traditional strollers, the seat assembly is usually oriented toward the front of the stroller in its direction of displacement. Because the child does not face the parent when seated in the stroller, no interaction is permitted between the child and the parent. To remedy the aforementioned deficiency, some approaches propose a stroller construction that has different seating configurations facing forward and rearward. For this purpose, the backrest assembly may be adjustable forward or rearward to allow the child to be seated either facing rearward or forward. However, the adjustment and lock mechanism of the backrest assembly is usually placed at a position adjacent to the seat, which may not be convenient to operate for the adult.

Therefore, there is a need for an infant carrier apparatus that can have multiple seating configurations, is convenient to operate and address at least the foregoing issues.

SUMMARY

The present application describes an infant carrier apparatus having multiple configurations of use, and its operating method. The infant carrier apparatus has an adjustable backrest assembly that is held in place via a backrest holding mechanism provided at a top transverse region of the backrest assembly. Accordingly, the backrest assembly can be adjusted in a convenient manner for changing the direction in which a child can be seated or laid down in the infant carrier apparatus.

In one embodiment, the infant carrier apparatus can comprise a seat assembly, a backrest assembly including a first and second backrest frame, and a backrest holding mechanism. The first backrest frame includes at least one first side segment and a first transverse segment, the second backrest frame include at least one second side segment and a second transverse segment, the first side segment being coupled with the seat assembly via a first pivot point. The backrest holding mechanism can be movably assembled between the first and second transverse segment, and include a latch element movable between a first and second position, wherein the first position of the latch element causes the backrest holding mechanism to be in locking engagement with the first transverse segment to prevent rotation of the backrest assembly relative to the seat assembly, and the second position of the latch element removes the locking engagement of the backrest holding mechanism with the first transverse segment to permit rotation of the backrest assembly relative to the seat assembly.

At least one advantage of the apparatus and method described herein is the ability to arrange the backrest holding mechanism at a top transverse portion of the backrest assembly easily accessible to an adult. Accordingly, the backrest holding mechanism can be conveniently operated with one hand to unlock and adjust the backrest assembly.

DETAILED DESCRIPTION OF THE EMBODIMENTS

The present application describes an infant carrier apparatus having multiple configurations of use, and its operating method. The infant carrier apparatus has an adjustable backrest assembly that can be locked in any desirable angular positions via a backrest holding mechanism provided at a top transverse region of the backrest assembly. Accordingly, the backrest assembly can be conveniently adjusted to change the direction in which a child can be seated or laid down in the infant carrier apparatus.

Figure 1:
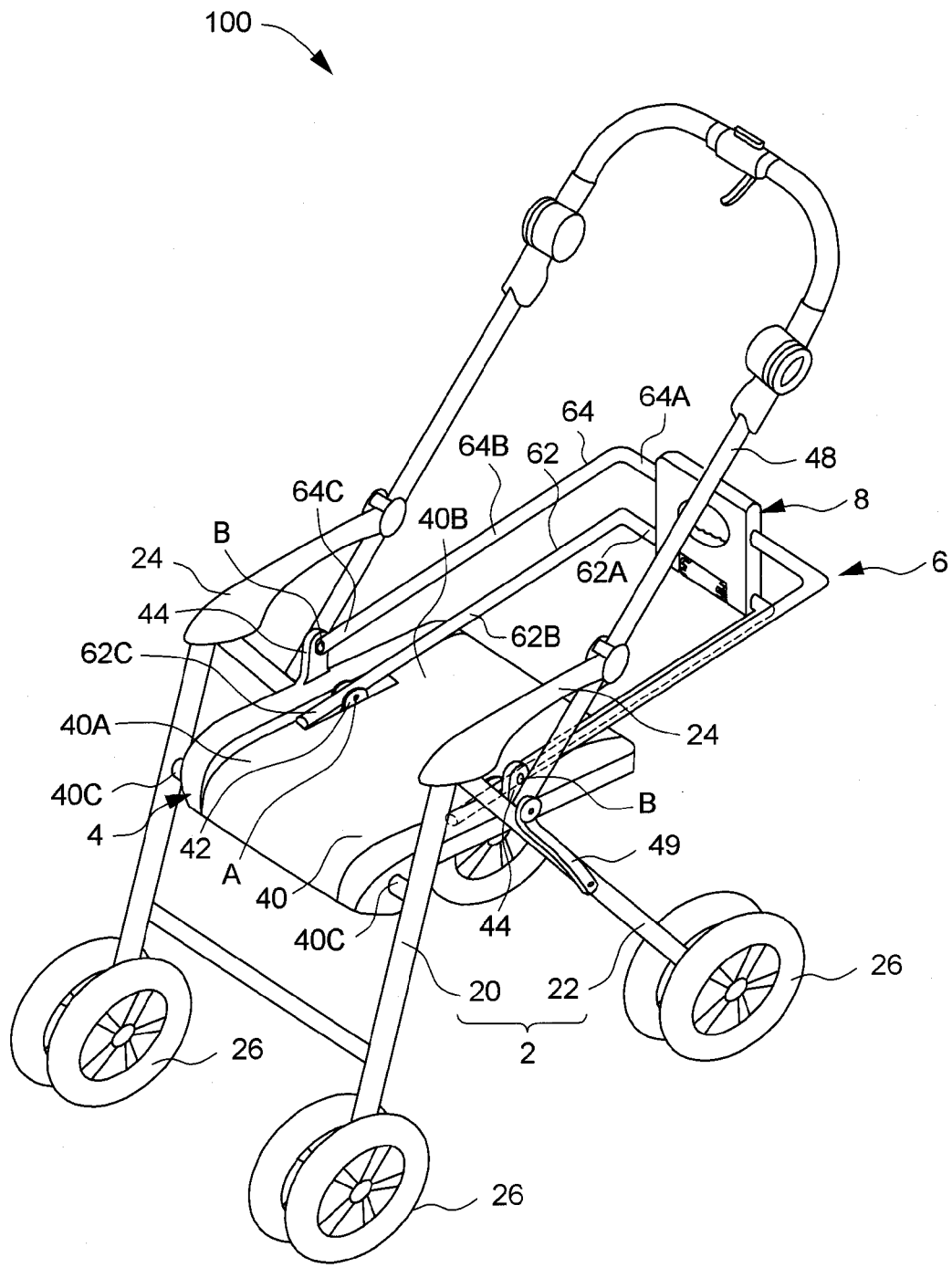
FIG. 1 is a schematic view illustrating a stroller embodiment of an infant carrier apparatus.

FIG. 1 is a schematic view illustrating a stroller embodiment of an infant carrier apparatus 100. The infant carrier apparatus 100 can comprise a support frame 2, a seat assembly 4, a backrest assembly 6, a backrest holding mechanism 8 that can hold the backrest assembly 6 at an adjusted position, and a generally U-shaped handle 48. The support frame 2 can include a front leg frame 20, rear leg frame 22, two armrests 24 and a plurality of wheels 26. The front and rear leg frames 20 and 22 can have upper ends respectively coupled with the armrests 24, and lower ends respectively mounted with the wheels 26. In turn, the seat assembly 4 is held and supported between the front leg frame 20 and the handle 48, whereas the backrest assembly 6 is movably connected with the seat assembly 4.

Figure 2:
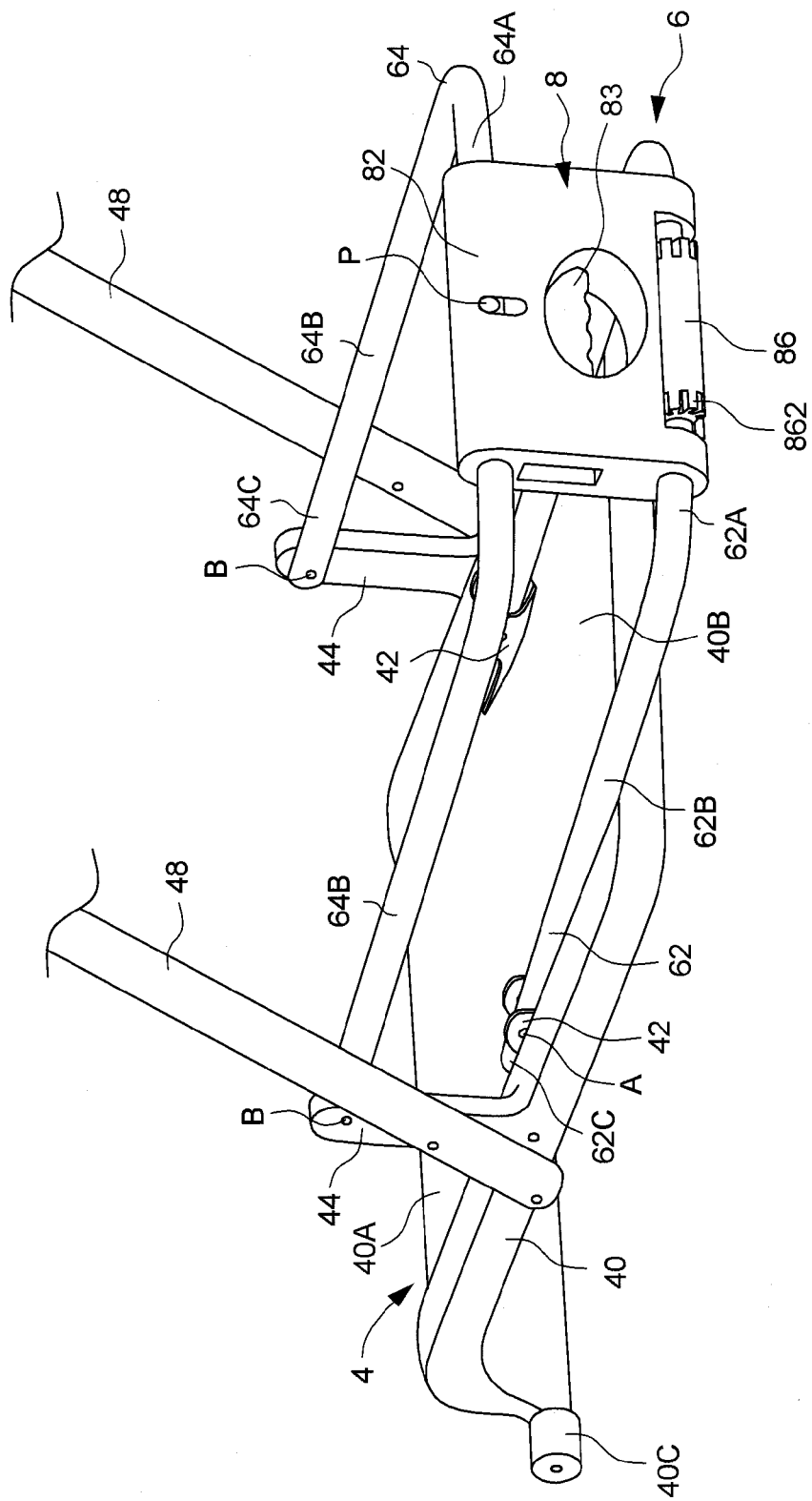
FIG. 2 is a schematic view illustrating the construction of a seat assembly, backrest assembly and backrest holding mechanism in the infant carrier apparatus shown in FIG. 1.

FIG. 2 is a schematic view illustrating the construction of the seat assembly 4, the backrest assembly 6 and the backrest holding mechanism 8. The seat assembly 4 can include a seat board 40 having a front seat portion 40A and a rear seat portion 40B. A front end of the seat board 40 can have right and left side edges respectively provided with protruding joint portions 40C through which the seat board 40 can be pivotally connected with the front leg frame 20. A middle region of the seat board 40 can have right and left sides where first coupling brackets 42, which may include ear-like protrusions, can respectively project upward in a symmetrical manner. According to one embodiment, a limit between the front seat portion 40A and the rear seat portion 40B can be defined by the position of the first coupling brackets 42. Outer edge regions of the seat board 40 adjacent to the outer sides of the first coupling brackets 42 can be provided with second coupling brackets 44 that are also protruding upward in a symmetrical manner. The backrest assembly 6 can be pivotally connected with the seat assembly 4 at the first and second coupling brackets 42 and 44, respectively.

The handle 48 can be mounted to cross the width of the seat board 40, such that the two side segments of the U-shaped handle 48 can be pivotally connected with the right and left sides of the seat board 40 via linkage arms 49. In this manner, an adult can use the handle 48 to push the infant carrier apparatus 100 in movement.

The backrest assembly 6 can comprise a first backrest frame 62, and a second backrest frame 64 mounted at a position spaced apart from the first backrest frame 62. In one example, the first and second backrest frames 62 and 64 can be constructed as tubular frames, the first backrest frame 62 providing main backrest support, the second backrest frame 64 providing right and left side support. According to one embodiment, the first backrest frame 62 can have a generally U-shape including a transverse segment 62A, and two side segments 62B that are respectively joined with right and left ends of the transverse segment 62A and terminate into distal or lower end portions 62C. The first backrest frame 62 can be constructed from one integral tube or the assembly of multiples tube sections. The two lower end portions 62C at the right and left sides of the first backrest frame 62 can be pivotally connected at pivot points A with the first coupling brackets 42 at the right and left sides of the seat assembly 4, respectively. In one embodiment, the pivot axis that couples the handle 48 with the linkage arms 49 can be aligned with the pivot axis of the pivot points A, such that the first backrest frame 62 and the handle 48 can respectively rotate about a same axis.

The second backrest frame 64 can be constructed from one integral tube or the assembly of multiples tube sections to form a generally U-shape including a transverse segment 64A, and two side segments 64B that are joined with right and left side ends of the transverse segment 64A and terminate into distal or lower end portions 64C. The transverse and side segments 64A and 64B of the second backrest frame 64 can have a contour shape generally parallel to the transverse and side segments 62A and 62B of the first backrest frame 62. The second backrest frame 64 can be mounted such that the side segments 64B and distal or lower end portions 64C thereof are respectively located at the outer side of the corresponding side segments 62B and distal or lower end portions 62C of the first backrest frame 62, such that a distance between the two opposite side segments 64B of the second backrest frame 64 can be greater than a distance between the two opposite side segments 62B of the first backrest frame 62. Like the first backrest frame 62, the second backrest frame 64 can be mounted such that the distal or lower end portions 64C can be pivotally connected at pivot points B with the second coupling brackets 44 at the right and left sides of the seat board 40, respectively. Accordingly, each of the first and second backrest frames 62 and 64 is individually connected pivotally with the seat assembly 4.

The transverse segment 62A of the first backrest frame 62 and the transverse segment 64A of the second backrest frame 64 can be pivotally connected with the backrest holding mechanism 8, respectively. Owing to the movable connection of the backrest holding mechanism 8, the first and second backrest frames 62 and 64 can rotate in unison about their respective pivot points A and B and along approximately parallel paths. In one embodiment, the horizontal positions of the pivot points B can be above the horizontal positions of the pivot points A so that the first and second backrest frames 62 and 64 can rotate synchronously in a smooth manner.

Figure 3:
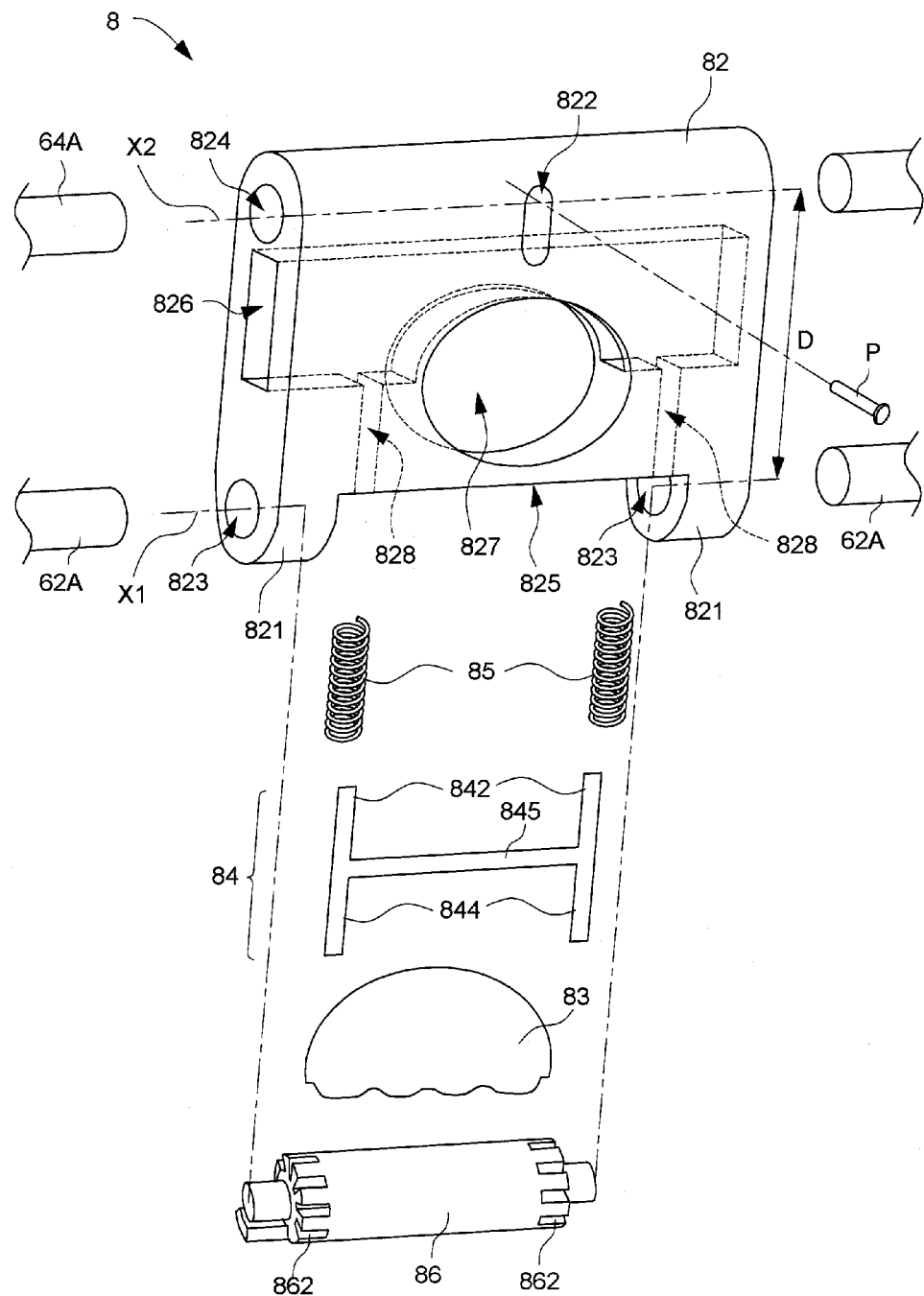
FIG. 3 is an exploded view of the backrest holding mechanism.

In conjunction with FIG. 2, FIG. 3 is an exploded view of the backrest holding mechanism 8. The backrest holding mechanism 8 can include a movable link element 82, a release button 83, a latch element 84 and a spring 85. The link element 82 can be a hollow housing having a side provided with two flanges 821 spaced apart from each other along a horizontal direction, first holes 823 respectively formed coaxial through the flanges 821, and a second hole 824 parallel to the first holes 823 formed through the link element 82 at another side. The link element 82 can be integrally formed from a rigid material (such as plastics), or constructed from the assembly of multiple housing parts. The transverse segment 62A of the first backrest frame 62 can be pivotally assembled through the first holes 823 to form a first pivot axis X1. A pin P can engage through an elongated slot 822 of the link element 82 and the transverse segment 64A to restrain the link element 82 from moving laterally (i.e., in right and left side directions) relative to the transverse segment 64A. The transverse segment 64A of the second backrest frame 64 can be pivotally assembled through the second hole 824 to form a second pivot axis X2. As the first and second backrest frames 62 and 64 respectively rotate about the pivot points A and B, the link element 82 can rotate about the first and second pivot axes X1 and X2 relative to the first and second backrest frames 62 and 64, whereas the pin P can slide in the elongated slot 822. As this movement occurs, a fixed distance D is kept between the first pivot axis X1/transverse segment 62A and the second pivot axis X2/transverse segment 64A.

The transverse segment 62A of the first backrest frame 62 can include a latch-engaging portion 86 at a location corresponding to a gap 825 delimited between the two flanges 821. The position of the latch-engaging portion 86 relative to the seat assembly 4 can change as the first backrest frame 62 rotates. The latch-engaging portion 86 can have a generally cylindrical shape having an outer surface provided with a plurality of radial grooves 862. As shown in FIG. 3, the latch-engaging portion 86 can be formed as a cylindrical drum part that is affixed with the transverse segment 62A at a location between the two flanges 821 of the link element 82. In the illustrated embodiment, the radial grooves 862 can be divided into two spaced-apart sets that are distributed circumferentially on the outer surface of the latch-engaging portion 86.

Figure 4:
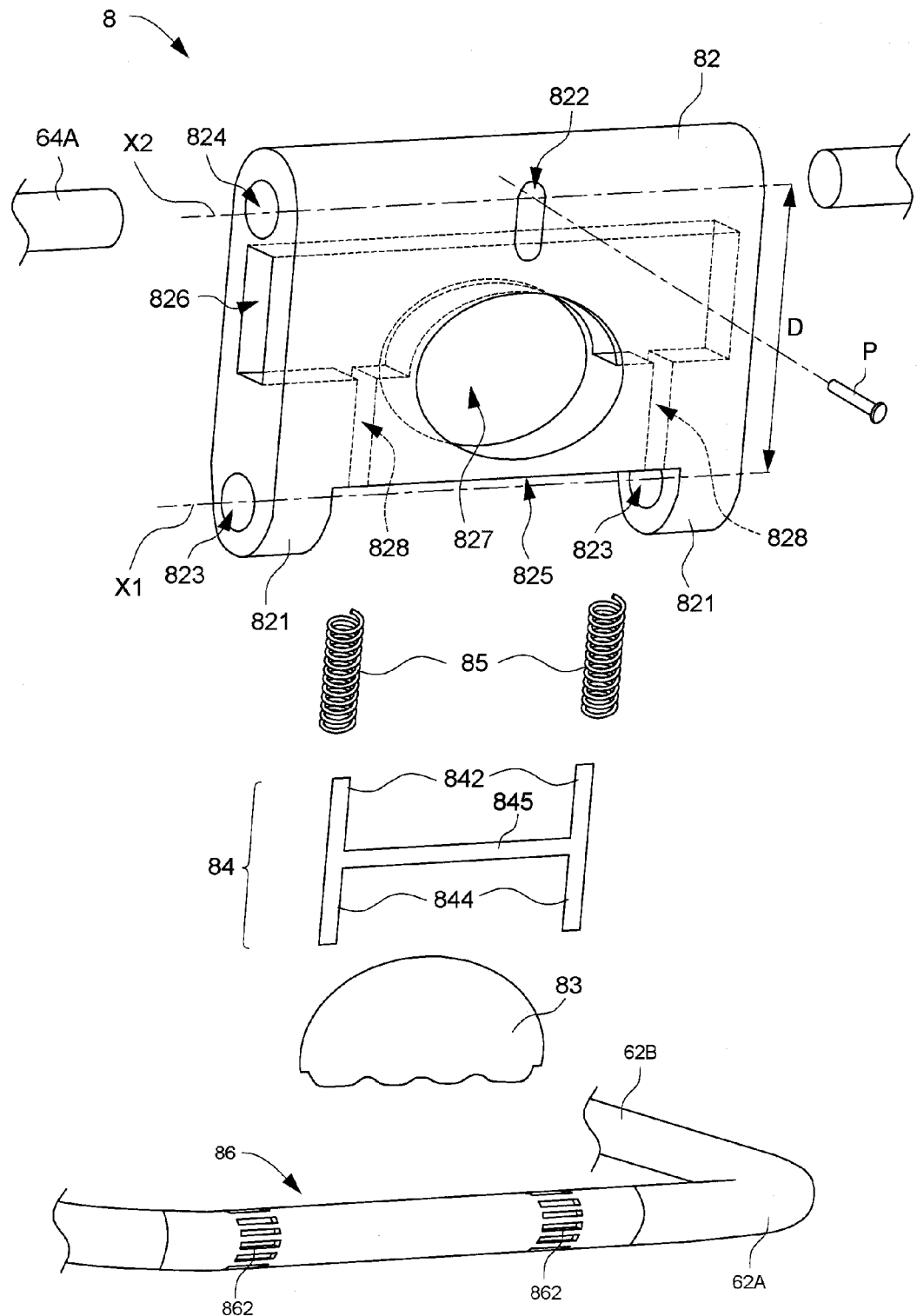
FIG. 4 is a schematic view illustrating a variant embodiment in which the latch-engaging portion can be directly formed on the transverse segment of the first backrest frame.

FIG. 4 is a schematic view illustrating a variant embodiment in which the latch-engaging portion 86 can be directly formed on the transverse segment 62A of the first backrest frame 62. In this case, the radial grooves 862 can be directly formed on the outer circumferential surface of the transverse segment 62A.

Referring again to FIG. 3, an inner cavity 826 can be provided inside the link element 82. The inner cavity 826 can extend from a left side to a right side of the link element 82, and pass through and communicate with an opening 827 provided at a central region of the link element 82. Moreover, the inner cavity 826 can communicate with the gap 825 via channels 828 formed at left and right sides of the opening 827. Each of the channels 828 is placed at a position facing the radial grooves 862.

The latch element 84 can be affixed with the release button 83, and mounted through the inner cavity 826 of the link element 82. In one embodiment, the latch element 84 can be formed in a single body, and include a plurality of connector prongs 842, latch fingers 844 projecting at a side opposite the connector prongs 842, and a transversal section 845 connected between the latch fingers 844. Each of the springs 85 can have a first end anchored with one prong 842, and a second end connected with an inner sidewall of the link element 82 (for example, a top inner sidewall of the inner cavity 826).

Figure 5:
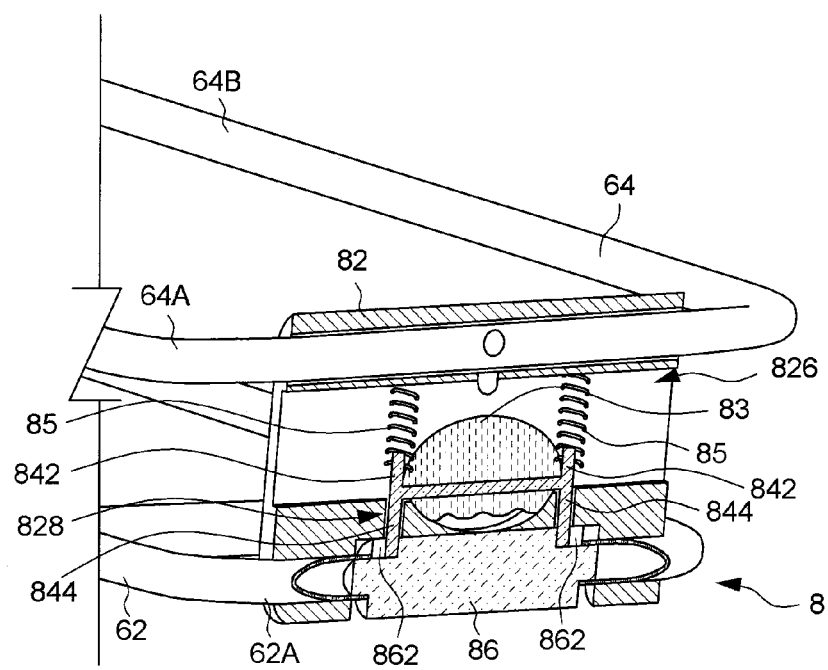
FIG. 5 is a schematic cross-sectional view showing the backrest holding mechanism in a locked state.

The release button 83 can be connected with the transversal section 845 of the latch element 84. Once the release button 83, the latch element 84 and the spring 85 are assembled in the link element 82, the latch fingers 844 can respectively pass through the channels 828 and face the radial grooves 862 (as shown in FIG. 5). A portion of the release button 83 can be exposed outward at the opening 827 for a user to operate the backrest holding mechanism 8. It is worth noting that in alternate embodiments, the release button can have two sides provided with connector prongs and latch fingers that are respectively assembled with the springs and the link element in a manner similar to the previously described embodiment. In other embodiments, the latch element can also be constructed to include a joint portion that connects the connector prongs with the latch fingers and is provided with an operable portion that can be pushed by a user.

Figure 6:
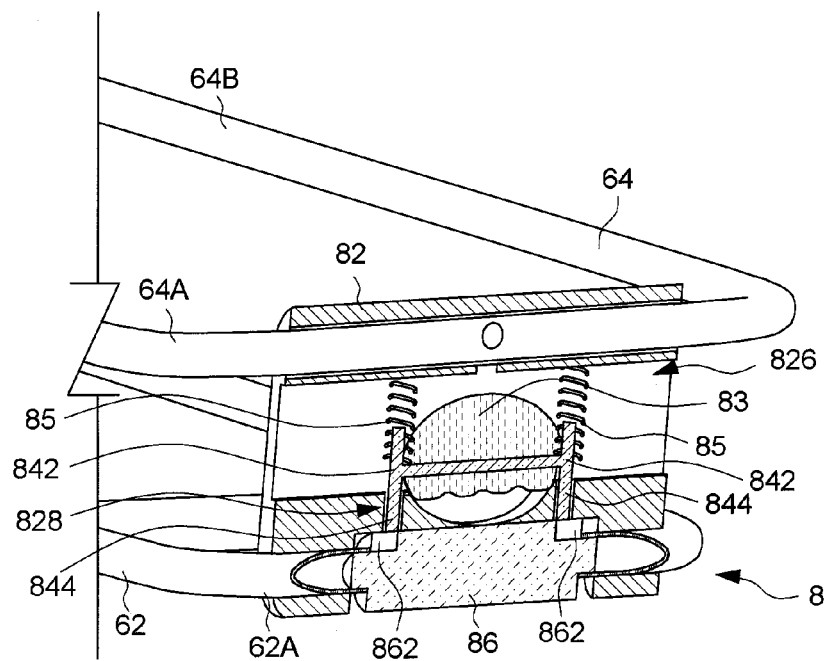
FIG. 6 is a schematic cross-sectional view showing the backrest holding mechanism in an unlocked state.

FIGS. 5 and 6 are schematic cross-sectional views illustrating the operation of the backrest holding mechanism 8. In FIG. 5, the backrest holding mechanism 8 is shown in a locked state. The springs 85 can bias the latch element 84 and the release button 83 to move toward the latch-engaging portion 86 to a first position where the latch fingers 844 engage with the radial grooves 862. Owing to the engagement between the latch element 84 and the latch-engaging portion 86, the link element 82 can lock with the transverse segment 62A of the first backrest frame 62 to block the first backrest frame 62 from rotating about the first pivot axis X1 relative to the link element 82. Because the relative movement between the link element 82 and the first backrest frame 62 is blocked, the first and second backrest frames 62 and 64 cannot rotate about the pivot points A and B. Accordingly, the backrest assembly 6 can be locked in angular position relative to the seat assembly 4.

In FIG. 6, the backrest holding mechanism 8 is shown in an unlocked state. When the backrest assembly 6 is to be adjusted, the release button 83 can be pressed to squeeze the springs 85 and cause the latch element 84 to move to a second position away from the latch-engaging portion 86. As the latch fingers 844 disengage from the radial grooves 862, the locking engagement between the link element 82 and the first backrest frame 62 can be removed and the backrest holding mechanism 8 can be switched from the locked to unlocked state. While the backrest holding mechanism 8 is kept in the unlocked state, the first and second backrest frame 62 and 64 can be then rotated synchronously about the pivot points A and B to adjust the inclination of the backrest assembly 6 relative to the seat assembly 4. As the first and second backrest frames 62 and 64 rotate, the transverse segments 62A and 64A can be kept parallel to each other and a distance D there between can be kept substantially constant. Moreover, the link element 82 can rotate about the first and second pivots X1 and X2 relative to the first and second backrest frames 62 and 64, respectively. Once the backrest assembly 6 reaches a desired inclination, the pressure on the release button 83 can be released. As a result, the springs 85 can bias the latch element 84 to engage with another set of the radial grooves 862 to lock the backrest assembly 6 in position.

Figure 7:
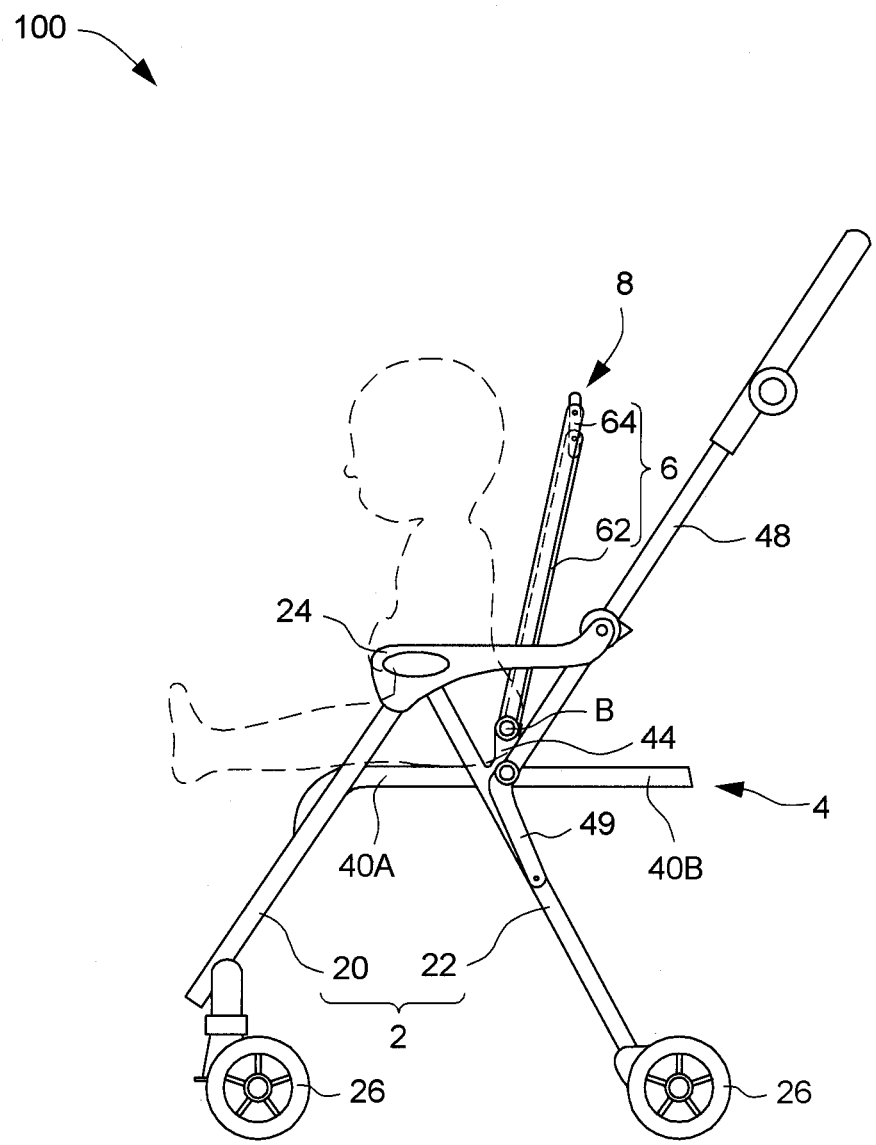
FIG. 7 is a schematic view showing the infant carrier apparatus in a seating configuration facing forward.

FIGS. 7 through 10 are schematic views illustrating the backrest assembly 6 of the infant carrier apparatus 100 at different angular positions. In FIG. 7, the infant carrier apparatus 100 is shown in a seating configuration facing forward. In this configuration, the backrest assembly 6 (including the first and second backrest frames 62 and 64) is inclined rearward such that the backrest assembly 6 and the front seat portion 40A of the seat assembly 4 can define a seating space facing forward.

Figure 8:
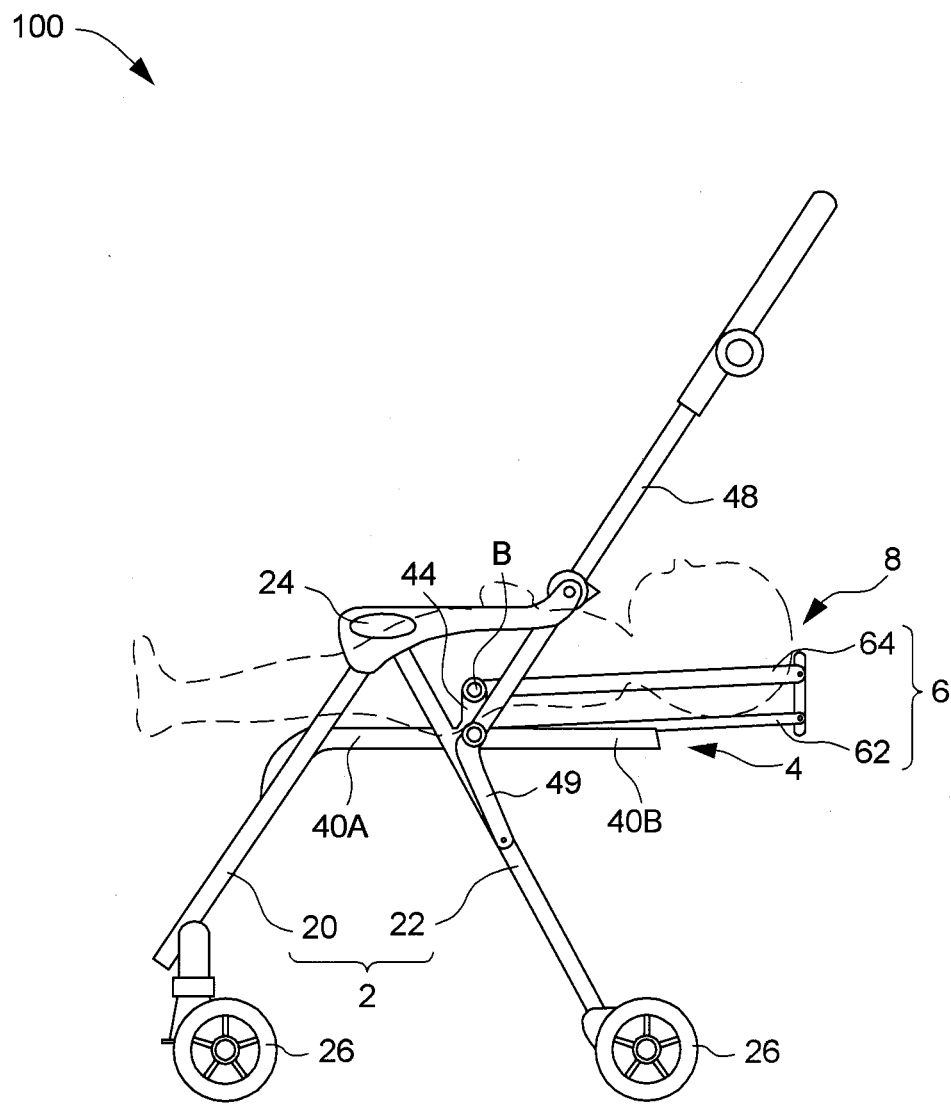
FIG. 8 is a schematic view showing the infant carrier apparatus in a rearward reclined position.

In FIG. 8, the infant carrier apparatus 100 is shown in a rearward reclined position. In this configuration, the backrest assembly 6 is adjusted rearward to a position substantially adjacent to the rear seat portion 40B. The backrest assembly 6 and the front seat portion 40A of the seat assembly 4 can accordingly define a resting area where a child can be laid down rearward in a substantially horizontal position, supported by the front seat portion 40A and the backrest assembly 6. As shown with phantom lines, the child thereby accommodated can have the feet oriented toward the front and the head oriented toward the rear of the infant carrier apparatus 100.

Figure 9:
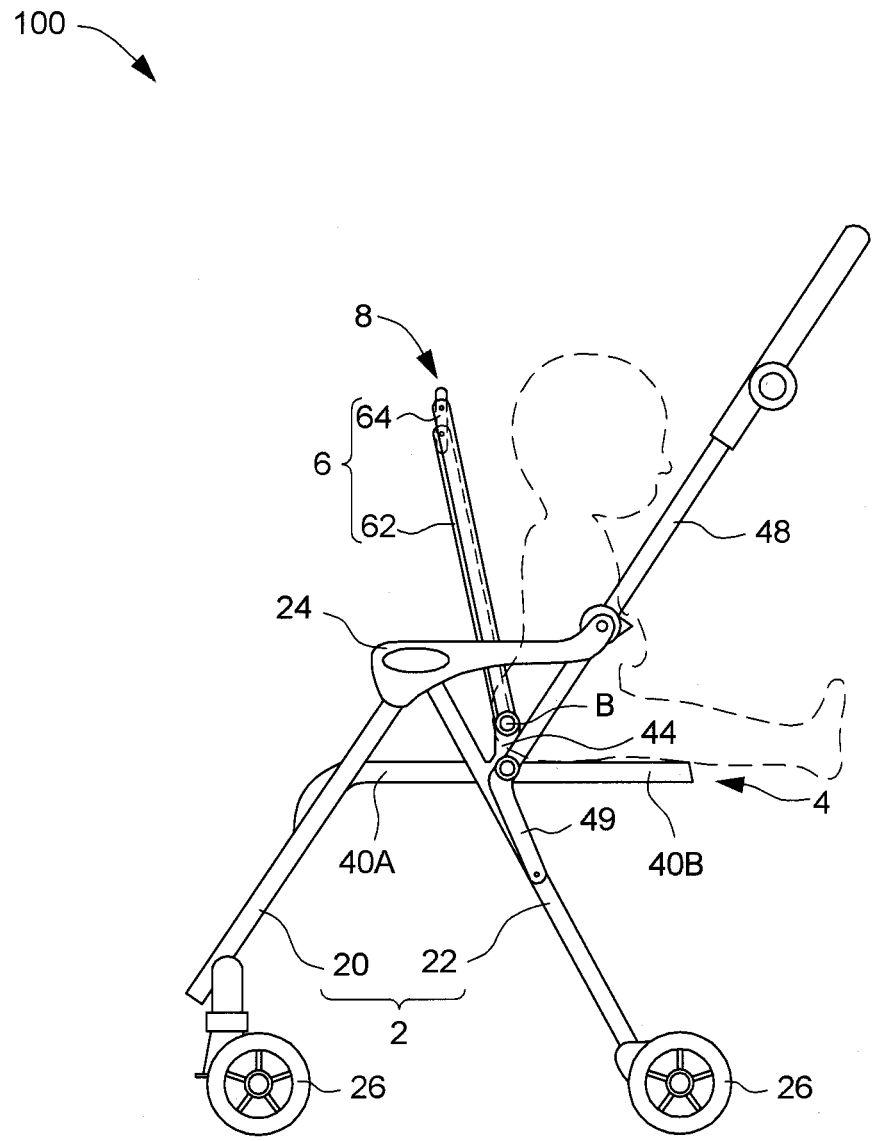
FIG. 9 is a schematic view showing the infant carrier apparatus in a seating configuration facing rearward.

In FIG. 9, the infant carrier apparatus 100 is shown in a seating configuration facing rearward. In this configuration, the backrest assembly 6 is inclined forward such that the backrest assembly 6 and the rear seat portion 40B of the seat assembly 4 can define a seating space facing rearward.

Figure 10:
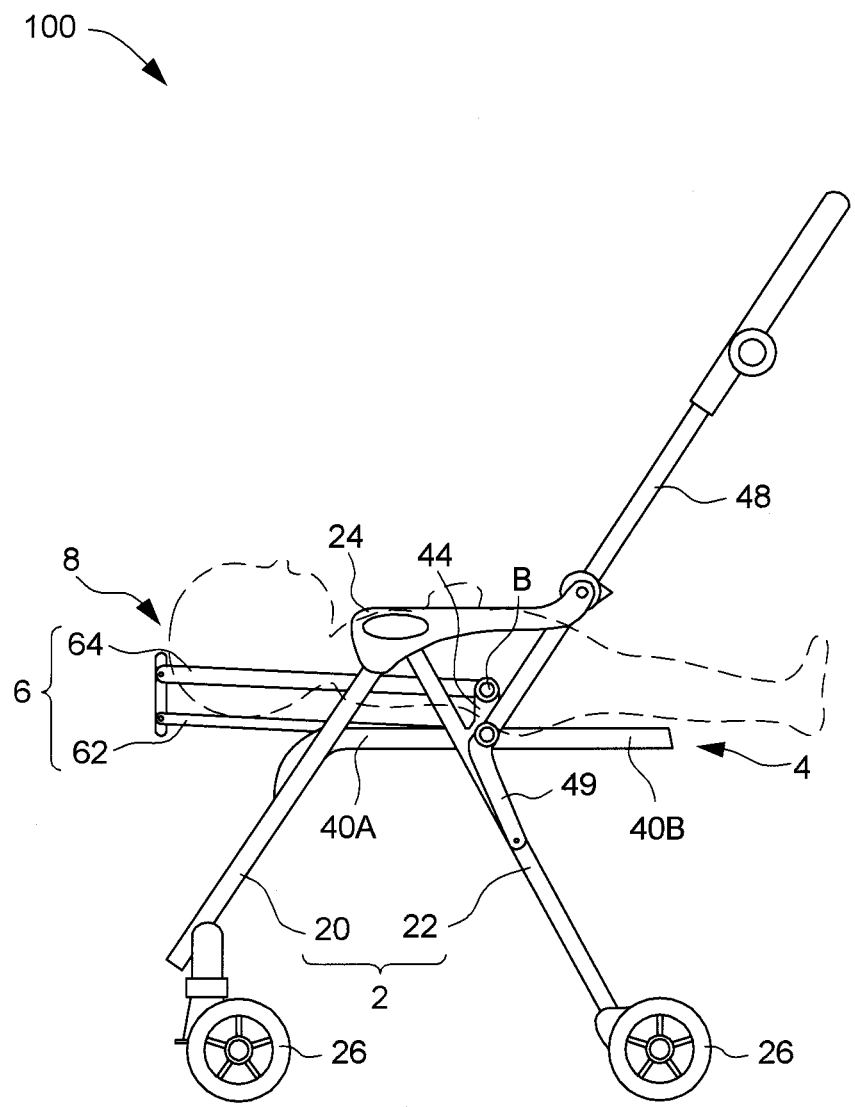
FIG. 10 is a schematic view showing the infant carrier apparatus in a forward reclined position.

In FIG. 10, the infant carrier apparatus 100 is shown in a forward reclined position. In this configuration, the backrest assembly 6 is adjusted forward to a position substantially adjacent to the front seat portion 40A. The backrest assembly 6 and the rear seat portion 40B of the seat assembly 4 can accordingly define a resting area where a child can be laid down rearward in a substantially horizontal position, supported by the rear seat portion 40B and the backrest assembly 6. As shown with phantom lines, the child thereby accommodated can have the feet oriented toward the rear and the head oriented toward the front of the infant carrier apparatus 100.

At least one advantage of the apparatus and method described herein is the ability to arrange the backrest holding mechanism 8 at a top transverse portion of the backrest assembly 6 easily accessible to an adult. Pressure can be applied on the release button 83 with one hand to conveniently unlock the backrest assembly 6 and adjust its angular position. The backrest holding mechanism 8 can lock the backrest assembly 6 at any desirable inclination. While the infant carrier apparatus 100 has been illustrated as a stroller embodiment, the mechanisms and structures described herein may be applicable to any types of infant carrier apparatuses, such as child seats, swing apparatuses, and the like.

Realizations in accordance with the present invention therefore have been described only in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope of the invention as defined in the claims that follow.

What is claimed is:

1. An infant carrier apparatus comprising:
   a seat assembly;
   a backrest assembly, including a first and second backrest frame, wherein the first backrest frame includes at least one first side segment and a first transverse segment, the second backrest frame includes at least one second side segment and a second transverse segment, the first side segment being coupled with the seat assembly via a first pivot point; and a backrest holding mechanism movably assembled between the first and second transverse segment, wherein the backrest holding mechanism includes a latch element movable between a first and second position;

wherein the first position of the latch element causes the backrest holding mechanism to be in locking engagement with the first transverse segment to prevent rotation of the backrest assembly relative to the seat assembly, and the second position of the latch element removes the locking engagement of the backrest holding mechanism with the first transverse segment to permit rotation of the backrest assembly relative to the seat assembly.

2. The apparatus according to claim 1, wherein the backrest holding mechanism further includes a link element that is respectively connected pivotally with the first and second transverse segments, the latch element being movably assembled with the link element.

3. The apparatus according to claim 2, wherein the link element is pivotally connected with the first transverse segment about a first pivot axis, and pivotally connected with the second transverse segment about a second pivot axis parallel to the first pivot axis.

4. The apparatus according to claim 2, wherein the second side segment is coupled with the seat assembly at a second pivot point.

5. The apparatus according to claim 4, wherein the second pivot point is located above the first pivot point.

6. The apparatus according to claim 4, wherein the first and second backrest frames are movable in unison owing to the movable connection of the link element, when the latch element is kept at the second position.

7. The apparatus according to claim 6, wherein the link element respectively rotates relative to the first and second transverse segments when the first and second backrest frames respectively rotate about the first and second pivot points.

8. The apparatus according to claim 1, wherein the first transverse segment includes a latch-engaging portion, the latch element when at the first position being in locking engagement with the latch-engaging portion.

9. The apparatus according to claim 8, wherein the latch-engaging portion includes a plurality of radial grooves, and the latch element is operable to engage with different radial grooves according to different angular positions of the backrest assembly relative to the seat assembly.

10. The apparatus according to claim 8, wherein the latch-engaging portion is changed in position relative to the seat assembly as the first backrest frame rotates.

11. The apparatus according to claim 8, wherein the backrest holding mechanism further includes at least a spring adapted to bias the latch element toward the first position into locking engagement with the latch-engaging portion.

12. The apparatus according to claim 11, wherein the backrest holding mechanism further includes a release button that is operable to cause the latch element to move toward the second position.

13. A method of operating an infant carrier apparatus, wherein the infant carrier apparatus includes a seat assembly and a backrest assembly, the backrest assembly including a first and second backrest frame, the first backrest frame having a first side segment coupled with the seat assembly at a first pivot point, the method comprising:

providing a backrest holding mechanism at a transverse portion of the backrest assembly, wherein the backrest holding mechanism is movably connected with a first transverse segment of the first backrest frame and a second transverse segment of the second backrest frame;

switching the backrest holding mechanism from a locked state to an unlocked state, wherein the first backrest frame is allowed to rotate relative to the backrest holding mechanism in the unlocked state; and rotating the backrest assembly relative to the seat assembly.

14. The method according to claim 13, wherein the backrest holding mechanism includes a link element that is respectively connected pivotally with the first and second transverse segment, and a latch element assembled with the link element, wherein the link element is locked with the first transverse segment via a locking engagement of the latch element.

15. The method according to claim 14, wherein the backrest holding mechanism further includes at least a spring adapted to bias the latch element into locking engagement with the first transverse segment.

16. The method according to claim 15, wherein the backrest holding mechanism further includes a release button, and the step of switching the backrest holding mechanism from a locked state to an unlocked state includes pressing the release button to cause the latch element to move out of the locking engagement with the first transverse segment.

17. The method according to claim 13, wherein the second backrest frame includes a second side segment that is coupled with the seat assembly at a second pivot point, and the first and second backrest frames rotate in unison relative to the seat assembly via the movable connection of the backrest holding mechanism.

* * * * *